United States Patent [19]

Doby

[11] 4,162,051
[45] Jul. 24, 1979

[54] TAPE RECORDER HAVING MAGNETICALLY CONTROLLED TAPE TENSIONING

[75] Inventor: William P. Doby, Raleigh, N.C.

[73] Assignee: Westinghouse Electric Corp., Pittsburgh, Pa.

[21] Appl. No.: 930,293

[22] Filed: Aug. 2, 1978

[51] Int. Cl.² ............................................. G03B 1/04
[52] U.S. Cl. ..................................... 242/201; 242/75.5
[58] Field of Search ............................... 242/199–204, 242/207, 75.5, 75.51, 189; 360/71, 73, 6; 64/28 M; 310/98

[56] References Cited

U.S. PATENT DOCUMENTS

| | | | |
|---|---|---|---|
| 2,746,691 | 5/1956 | Hoad | 242/207 |
| 2,969,200 | 1/1961 | Selsted | 242/189 |
| 3,584,250 | 6/1971 | Bottani | 310/98 |
| 3,602,458 | 8/1971 | Doby et al. | 242/199 |
| 3,636,277 | 1/1972 | Pohler | 360/84 |
| 3,809,336 | 5/1974 | Kollar et al. | 242/202 |
| 3,913,129 | 10/1975 | Snyder et al. | 360/6 |
| 3,967,790 | 1/1976 | Hess | 242/67.2 |

Primary Examiner—Leonard D. Christian
Attorney, Agent, or Firm—R. W. Smith

[57] ABSTRACT

A load survey tape recorder has a tape transport assembly including a supply spindle assembly having a magnetic brake and a take-up spindle assembly having a magnetic clutch. Substantially constant tensions are maintained in a recording tape as it is driven between supply and take-up reels by the magnetic retarding forces of the magnetic brake and by a variable magnetic drive coupling of the magnetic clutch. A non-magnetic spacer is placed in one or both of the magnetic coupling gaps of the brake and clutch for improved operation.

8 Claims, 6 Drawing Figures

FIG. I

TAPE RECORDER HAVING MAGNETICALLY CONTROLLED TAPE TENSIONING

BACKGROUND OF THE INVENTION

1. Field of the Invention

This invention relates to tape recorders having tape transport assemblies for driving a recording tape past a record head and between two cartridge reels, and more particularly to such recorders including load survey magnetic tape recorders having both magnetic brake and magnetic clutch arrangements for maintaining controlled and substantially constant tape tensions.

2. Description of the Prior Art

The present invention is closely related and is an improvement of a load survey type of magnetic tape recorder disclosed and claimed in U.S. Pat. No. 3,602,458, assigned to the assignee of this invention. The tape recorder is intended for substantially continuous use in varying environmental conditions requiring a highly reliable and rugged construction features. The tape transport assembly of the prior recorder utilizes a mechanical friction producing arrangement for providing a predetermined drag or retarding force on a take-up pulley assembly that receives the supply reel of a removable tape cartridge. The drag maintains a predetermined tension in the recording tape as it is pulled from the supply reel by a capstan assembly of the recorder. The capstan is driven directly from a constant speed drive motor. A take-up pulley assembly engages the take-up reel of the cartridge and is driven by a slipping spring belt which, in turn, is driven by the capstan assembly. Slippage between the spring belt and the take-up pulley assembly occurs to maintain a proper tape speed between the capstan and the take-up reel as the tape is fed thereto. While the aforementioned recorder has been highly reliable and dependable in extended service under sometimes different environmental conditions, reduction of the mechanical and frictional between the retarding and driving coupling of the supply pulley and take-up pulley assemblies is desirable. The associated drag cord and spring belt drive tend to be some limitation to the life of the recorder and require maintenance and cleaning of dirt and debris between the frictional engaging parts. Thus, rotational drag at the supply pulley assembly is desired to be better isolated from a stationary retardation producing member and the driving torque to the take-up pulley assembly is desired to be transmitted across a more maintenance-free clutch interface.

In U.S. Pat. No. 3,636,277, a video tape recorder requires a rotating magnetic head which has a rotation synchronized to the tape speed by a eddy current brake and hysteresis coupling arrangement. Further eddy current brake and hysteresis coupling arrangements are described for the capstan drive and guide rollers. In U.S. Pat. No. 3,967,790, a tape cartridge drive is disclosed having a capstan drive including a magnetic clutch which, in turn, is coupled by gears to a take-up reel spindle. In U.S. Pat. No. 3,809,336, a tape transport is described for bi-directional tape feed and take-up. The transport includes a separate pair of clutches and a separate magnetic coupling, interconnecting each of two tape spools and a drive motor. Symmetrical operation allows the spools to be interchanged as take-up and supply spools operated at high velocities and subject to periodic stopping and starting. An air gap space in each magnetic coupling is exposed to small debris and magnetic particles capable of accumulating thereto to alter the torque and speed characteristics between the input and output of the couplings. U.S. Pat. No. 3,584,250 discloses a film projector take-up reel assembly rather than a tape recorder having a capstan tape drive arrangement. The take-up reel assembly includes a magnetic drive coupling between a drive motor and the take-up reel. A cylindrical cage carries annular permanent magnets and a magnetically permeable ring axially spaced from the permanent magnets. The ring is fixed to a drive shaft of the take-up reel so that the motor torque is transmitted across a magnetic air gap spacing of the coupling. The magnetic coupling air gap is adjustable to adjust the maximum load transmitted by the coupling. Upon film rewinding, the magnetic gap coupling provides magnetic breaking as film is fed off of the take-up spool.

The present invention is directed to an improved tape drive arrangement for a unidirectional slow speed and continuously operating magnetic tape recorder having a magnetic brake at a supply spindle assembly and a magnetic clutch at the take-up spindle assembly to provide reliable and consistent operation, and for controlling the supply and take-up tape tensions and speeds wherein the magnetic clutch and brake arrangements include relatively movable parts including a magnetized part and a permeable magnetic part separated by a protected non-magnetic gap space to prevent undesired accumulations of foreign material altering desired relative rotation between the two magnetic coupling parts.

SUMMARY OF THE INVENTION

In accordance with the present invention, a load research magnetic tape recorder receives a two reel tape cartridge and includes a tape transport assembly including a capstan assembly, and supply and take-up spindle assemblies. The capstan and take-up spindle assemblies are driven by a drive motor so that magnetic tape is pulled from the supply reel past a magnetic record head and onto the take-up reel of the cartridge. The capstan assembly is driven directly from a drive motor and engages the recording tape at a pinch roller to continuously drive the tape at low tape speeds. The supply spindle assembly includes a two-part magnetic brake including stationary and rotating parts with one part being permanently magnetized and the other part being of a soft or permeable magnetic material. The upper end of the rotating part includes pins for engaging the hub of a tape supply reel of the cartridge. Permanent magnet flux of the magnetized part is directed into the permeable magnetic material of the other part so as to provide magnetic attraction therebetween producing a predetermined drag force on the supply reel as tape is pulled therefrom by the capstan. A thin non-magnetic spacer washer separates the two magnetic brake parts to protect the space therebetween from accumulating dirt and debris and attraction of magnetic particles therebetween tending to alter the magnetic retarding effect thereof and producing damage to the brake parts. The spacer washer provides the non-magnetic air gap spacing and effects added frictional forces adding to the magnetic drag forces of the brake.

The capstan assembly includes a capstan shaft and a gear carried at the lower end thereof which is directly driven by a drive motor pinion gear. The motor provides constant rotating speed at the capstan. A positive driving and non-slipping drive belt connects the capstan assembly to the take-up spindle assembly including a magnetic clutch. The magnetic clutch has two parts including a clutch driving part driven by the non-slipping belt and a clutch driven part carrying reel hub engaging pins for driving the take-up reel of the cartridge. One of the magnetic clutch parts is permanently magnetized and the other is made of a soft or permeable magnetic material so that the driven clutch part is rotated by the drive motor via the magnetic coupling between the driven and driving parts of the magnetic clutch. Controlled take-up reel speed is maintained by increasing slippage at the clutch so that the magnetic tape speed between the capstan and the take-up reel is substantially constant during the tape transporting operation. A spacer washer in the air gap space of the magnetic clutch prevents accumulation of fragments of interfering materials.

Accordingly, supply and take-up recording tape tensions and speeds are controlled and maintained by an improved tape transport assembly including a supply spindle assembly having a magnetic brake with a spacer member formed between the stationary and rotational parts thereof and further including a take-up spindle assembly having a magnetic clutch with a spacer washer between the driven and driving parts thereof. The magnetic clutch and the magnetic brake cooperatively maintained the desired and controlled tape tensions at a tape supply reel and controlled speed variations at a tape take-up reel so as to prevent undesired tape transporting variations due to wear and contamination of the related moving parts and to produce increased reliable and maintenance-free operation for continuous operation under varying and often extreme environmental conditions. These and other advantages and features of the present invention will become apparent from the description of the drawings briefly described hereinafter.

DESCRIPTION OF THE PREFERRED EMBODIMENTS

Figure 1:
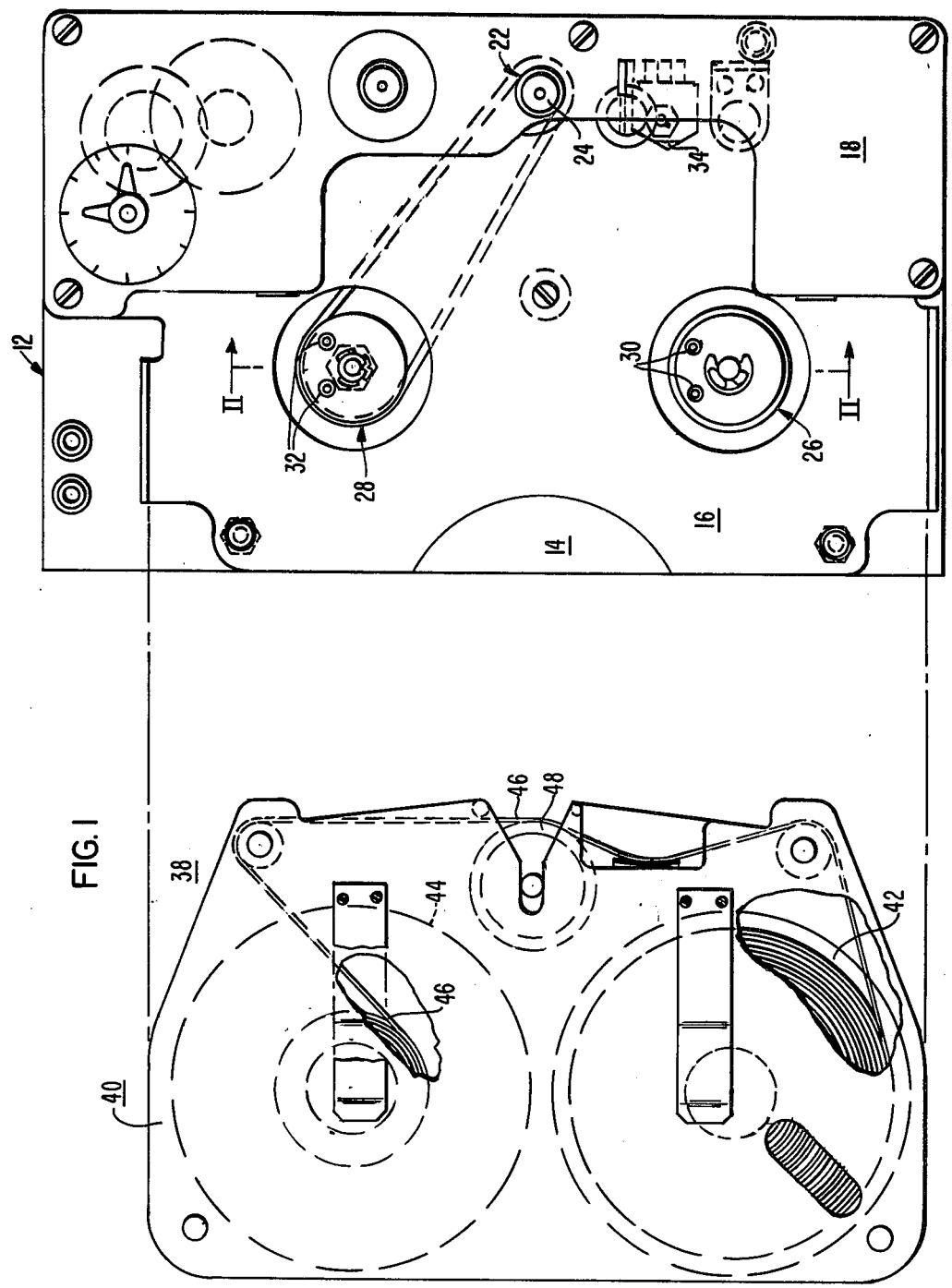
FIG. 1 is a front elevational view of a magnetic tape recorder made in accordance with this invention and an associated tape cartridge.

Referring now to the drawings and more particularly to FIG. 1, there is shown an electric load research tape recorder device 10 made in accordance with the present invention. The recorder 10 is typically used by electric power suppliers for electric power usage surveys wherein meter pulses are recorded along with time interval pulses as disclosed in U.S. Pat. Nos. 3,470,470 and 3,913,129, both assigned to the assignee of this invention. The present invention is an improvement of the recorder disclosed and claimed in U.S. Pat. No. 3,602,458 also assigned to the assignee of this invention, and incorporated herein by reference. The general arrangement and operation of the recorder 10 is described in the last-named patent except for the invention as described herein.

Generally, the recorder 10 includes a frame 12 formed by a bottom plate 14, middle plate 16, and top plate 18. The frame 12 carries the tape transport assembly 20, shown in FIG. 2 and forming an important feature of the present invention, as described more fully hereinbelow. The tape transport assembly 20 includes a capstan assembly 22 including a capstan shaft 24 and a supply spindle assembly 26 and take-up spindle assembly 28. Spring loaded pins 30 of the supply spindle assembly 26 and spring loaded pins 32 of the take-up spindle assembly 28 are exposed through openings of the middle plate 16. A magnetic record head 34 is carried on the middle plate 16 adjacent the capstan shaft 24.

A second main unit of the recorder 10 is a tape cartridge 38 which is substantially identical as described and claimed in the aforementioned U.S. Pat. No. 3,602,458 including a housing 40 having rotatably mounted therein a supply reel 42 and take-up reel 44 carrying a predetermined length of magnetic recording tape 46 extending between the reels 42 and 44 and around the outer surface of a spring biased pinch roller 48. Upon inserting the cartridge 38 into the cartridge receiving area over the middle plate 16, the pinch roller 48 biases the magnetic tape 46 against the capstan shaft 24 and positions the tape against the record head 34. As described in the aforementioned U.S. Pat. No. 3,602,458, the pins 30 and 32 engage the supply reel 42 and take-up reel 44, respectively. Controlled rotation of the reels is provided by the tape transport assembly 20 of the present invention.

Figure 2:
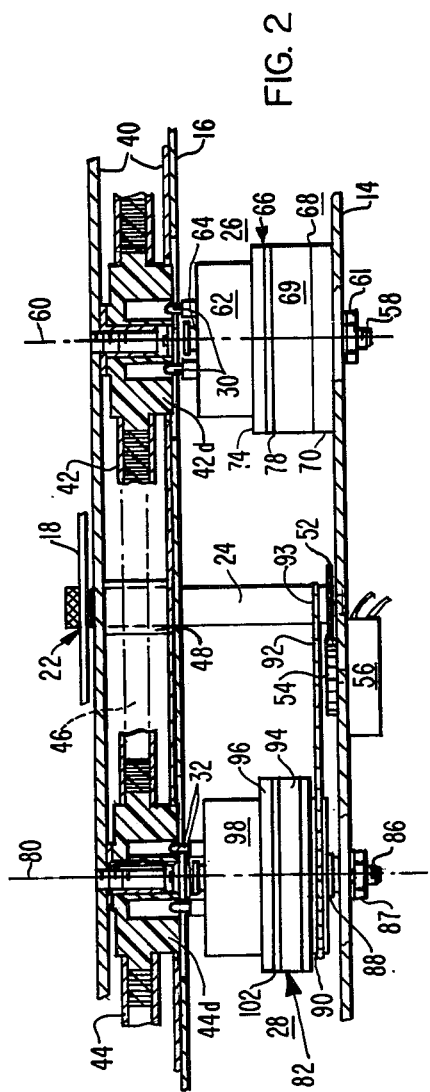
FIG. 2 is a cross-sectional view taken along the axis II—II in FIG. 1 and looking in the direction of the arrows with parts removed illustrating a tape transport assembly.

The tape transport assembly 20 is more clearly shown in FIG. 2 which is a cross-sectional view taken along the axis II—II of FIG. 1 and looking in the direction of the arrows. The operative parts of the cartridge 38 are shown in FIG. 2 for a better understanding of the present invention with the cartridge 38 being mounted in the operative and mounted position on the middle plate 16 with respect to the tape transport assembly 20 of the recorder 10. Accordingly, the reel 42 and reel 44 are shown with hub portions 42a and 44a thereof being engaged by the pins 30 and 32 of the spindle assemblies 26 and 28 as described hereinabove. The tape driving rotation of the capstan shaft 24 is provided at a gear 52 mounted on the bottom of the shaft 24 which meshes with a pinion gear 54 carried by the shaft of a drive motor 56. The drive motor 56, being carried by the bottom plate 14, rotates at a predetermined substantially low speed to impart a continuous unidirectional movement of the tape 46 from the supply reel 42 onto the take-up reel 44. The recorder 10 is typically in continuous use for periods in the order of one month and the tape speed moves slowly, in the order seven inches (17.8 cm.) per hour. The capstan shaft 24 is rotated approximately one revolution every 15 minutes for movement of 1.75 inches (4.4 cm.) of tape movement.

The supply spindle assembly 26 forming an important part of the tape transport assembly 20 includes a spindle shaft 58 positioned so as to be coaxially aligned along the axis 60 extending through the center of the supply reel 42 when mounted in the recorder 10. The lower end of the spindle shaft 58 is threaded so as to be secured by nut 61 within a hole opening of the bottom plate 14. The upper end of the assembly 26 terminates at the pins 30 carried by a pin support disc 62 held in place at the upper end thereof by a retaining clip 64 for rotation about the upper end of the spindle shaft 58. The assembly 26 includes a magnetic brake 66 for maintaining a controlled and substantially constant tape tension in the tape 46 as it is fed from the tape coil on the reel 42 to the pulling engagement between the pinch roller 48 and capstan shaft 24.

Figure 4:
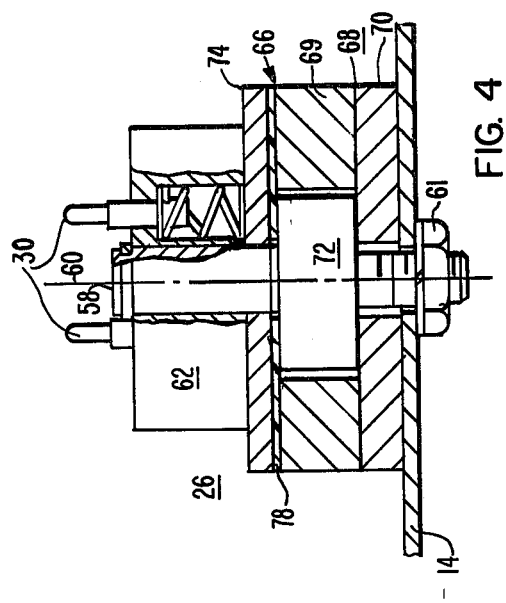
FIG. 4 is an enlarged view of a supply spindle assembly having a magnetic brake included in the tape transport assembly shown in FIG. 2.

The magnetic brake 66 is also shown in the enlarged view of FIG. 4 and includes a stationary part 68. The stationary part 68 is permanently magnetized including a flat ring 69, that is magnetized with several magnetic poles, and a magnet support plate 70 integrally attached by a suitable adhesive to the bottom face of the magnetized ring 69. In one preferred embodiment, the permanently magnetized ring 69 is formed of an Alnico 5 permanent magnet material oriented perpendicular to the diameter and having a thickness in the order of 0.16 inch (0.4 cm.), an outer diameter in the order of 1.25 inch (3.18 cm.) and a center hole having a diameter of 0.625 inch (1.6 cm.). The magnetized ring 69 is magnetized with eight magnetic poles circumferentially spaced on the upper face of the ring 69 around the shaft 58. The common direction of magnetization of the eight magnetic poles is parallel with the axis 60.

An enlarged diameter section 72 of the shaft 58 is disposed in the center opening of the ring 69. The lower part of shaft 58 extends through the center of the magnetic support plate 70 so that a lower annular shoulder of the shaft portion 72 is clamped against the support plate 70 when the shaft 58 is attached to the bottom plate 14 by means of the nut 61 threaded to the threaded end of the shaft 58.

Figure 3:
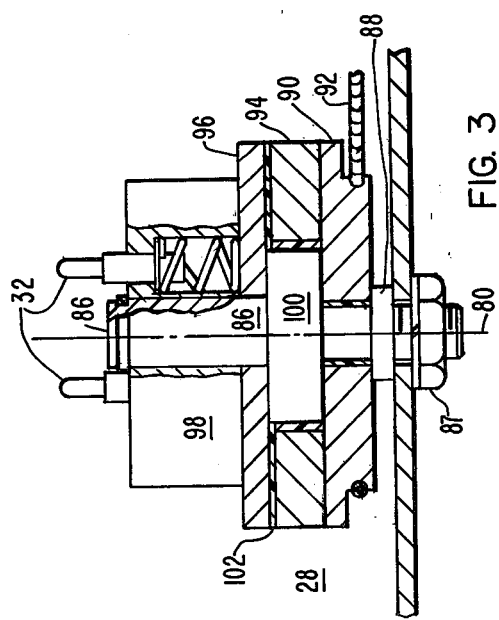
FIG. 3 is an enlarged view showing of a take-up spindle assembly having a magnetic clutch included in the tape transport assembly shown in FIG. 2.

A rotational part 74 of the magnetic brake 66 is formed by an annular permeable or soft magnetic plate (formed of a cold rolled steel material) that is integrally attached to the bottom of the pin support disc 62. It is to be understood that the permanent magnet material, such as forming the ring 69 has a high retentivity property so that residual magnetism therein remains substantially permanently. The soft or permeable magnetic material used for the plates 70 and 74 has a low reluctance characteristic while having a relatively low retentivity property. Holes in the centers of the magnetic plate 74 and of the pin support disc 62 receive the upper end of the spindle shaft 58. A spacer washer 78 is mounted on the shaft 58 and in the non-magnetic air gap between the magnetized ring 69 and soft magnetic plate 74. The spacer washer is preferably made of a non-magnetic plastic film material sold under the trademark "Mylar" by Du Pont de Nemours, E. I. and Company or the equivalent. The Mylar material is a polyethylene terephthalate composition which is strong and wear resistant, non-porous and dimensionally stable at high temperatures and further has substantially no magnetic characteristics. The spacer washer 78 has a thickness in the order of 0.01 inch (0.25 cm.) and has a outer diameter in the order of 1.125 inch (2.9 cm.) and has a hole in the center thereof to receive the shaft 58 as shown in FIGS. 2 and 3.

The spacer washer 78 spaces the lower face of the magnetic plate 74 and the upper face of the permanent magnetized ring 69 so as to control the gap space therebetween. The gap is referred to as an air gap to distinguish from a low reluctance path, although the plastic washer 78 is disposed therein. This provides an important advantage in this invention in that the non-magnetic or air gap through which the magnetic fluxes pass between the magnetic poles of the ring 69 and plate 74 is accurately controlled. Thus, the gap spacing is variable with different thicknesses of the washer. If the magnetic plate 74 rests on the upper shoulder of the enlarged shaft section 72, extremely close tolerances in manufacturing must be maintained and assembling of the parts must be carefully controlled in order to maintain a controlled magnetic air gap space. The use of the spacer washer eliminates the very close exactness in these manufacturing operations. A further highly advantageous feature of the spacer washer 78 is that the gap space between the magnetized ring 69 and the magnetic plate 74 is occupied by the washer 78 so that dust and magnetic particles are not attracted and collected therein to vary the characteristics of the magnetic brake operation and cause wear and damage to the relatively rotating parts of the magnetic brake 66. The spacer washer 78 additionally provides a substantial proportion of drag provided by the magnetic brake so that the overall size of the magnetized ring 69 may kept at a minimum to reduce the cost and space required for the supply spindle assembly 26.

The magnetic brake 66 is assembled by first magnetizing the ring 69 with plural magnetic poles. Then the integral parts 69 and 70, washer 78 and integral parts 62 and 74 are assembled to the spindle shaft 58. A test reel is engaged by the pins 30 and the torque required to rotate the test reel measured. The ring 69 is demagnetized until the desired braking torque is obtained. A calibrated torque of 1.2 inch-ounces is provided to rotate the disc 62 against the drag force of the brake 66. Dimensional changes in the gap spacing between the parts 74 and 69 can produce undesired results whereas use of the washer 78 closely controls the gap so that it is substantially constant.

The tape tension between the reel 42 and the capstan shaft increases slightly in operation from a substantially full reel so that the tension approximately doubles when the reel becomes empty of tape. It is believed that the permanent magnet fluxes from the ring 69 induce consequent or virtual poles in the permeable magnetic plate 74. The resulting magnetic attraction between the permanent magnet poles and virtual poles resists rotation of the plate 74. The washer 78 produces an additional frictional retarding force on the plate 74. Thus, the tension in tape 46 between the reel 42 and capstan shaft 24 is within controlled low limits, generally in an approximate range of two to four ounces, so as to be characterized as being substantially constant. It is to be recalled that the rotation of the reel 42 varies within a relatively low range of speeds.

The take-up spindle assembly 28 shown in FIG. 2 is mounted along the axis 80 including the center axis of the take-up reel 44 when the cartridge 38 is in the mounted and operative position shown in FIG. 2. A magnetic clutch 82 is included in the assembly 28 to rotate the reel 44 when it is engaged by the pins 32 so as to wind up the tape 46 into a coil thereon as the tape is fed from the capstan shaft 24 and pinch roller 48. The speed is varied as the tape 46 is wound on the reel so that it does not pull the tape relative to the capstan nor allow access slack in the take-up tape portion between the capstan and the coil on the reel 44.

As shown more clearly in FIG. 3, a spindle shaft 86 of the assembly 28 is mounted along the axis 80 and the lower threaded end thereof receives a nut 87 which holds the shaft 86 to the bottom plate 14. A bushing 88 supports the bottom of a pulley 90 on the bottom plate 14. The bushing 88 and the pulley 90 may be made of an integral part. A groove in the pulley 90 receives a belt 92 mounted in a groove 93 at the lower end of the capstan shaft 24 shown in FIG. 2. The belt 92 is in non-slipping engagement with the groove 93 and the groove in the pulley 90.

A permanently magnetized flat ring 94 is secured by a suitable adhesive to the pulley 90 and has a hole through the center thereof receiving the spindle shaft 86. The magnetized ring 94 is made of a permanent magnet material such as that described for the ring 69 and includes a plurality, such as eight, magnetic poles therein circumferentially disposed around the shaft 86. A stronger permanent magnetizing material may be used in some instances rather than the type used for the ring 69 due to reduced space for the ring 94. The magnetized ring 94 forms the driving part of the magnetic clutch 82.

The driven part of the magnetic clutch 82 includes a permeable or soft magnetic plate 96 integrally attached to a pin support disc 98 corresponding to the pin support disc 62. In an alternative embodiment, the plate 96 is also formed of a permanent magnet material having corresponding plural magnetic poles therein in a magnetically attracting relationship with the magnetic poles of the ring part 94. The magnetic plate 96 is positioned above the magnetized ring 94 by a bearing washer or enlarged shaft section 100 of the shaft 86 so that a predetermined axial magnetic air gap is formed between the magnetic poles of the magnetized ring 94 and magnetic plate 96. The air gap space of the clutch optionally includes a Mylar spacer washer 102 formed to fit in the space between the magnetized ring 94 and magnetic plate 96 to protect against accumulation of dirt and magnetized particles in the magnetic coupling space between the parts 94 nd 96.

The magnetic coupling between the driven part 96 and driving part 94 of the clutch 82 is also believed due to the attraction between the consequent or virtual poles induced in the plate 96 and the permanent magnet poles of the ring 94. The changes in relative rotation or slippage are due to the changes in the diameter of the tape on the reel 44 but in a controlled manner as established by the clutch 82.

In operation of the tape transport assembly 20, the supply reel 42 is considered to be initially filled with a coil thereon of the tape 46 with the take-up reel 44 being substantially empty of the tape 46. The motor 56 drives the capstan shaft 24 through the gears 54 and 52 at the speed of one revolution per fifteen minutes as noted hereinabove. The magnetic brake 66 produces a drag on the reel 42 so that resisting torque is developed at the reel 42 when the capstan pulls the tape 46. As understood in the operation of tape recorders, the supply reel 42 initially moves slower than the take-up reel 44 due to the differences in diameters of coils of the tape 46 on the reels. Initially, a minimum amount of slippage and highest output speed relative to a constant input speed occurs at the magnetic clutch 82 of the take-up spindle assembly 28. Also, initially, about three inches of tape is wound on the take-up reel 44 with each revolution thereof whereas approximately ten inches of tape is fed from the reel 42 with each revolution thereof. As the tape 46 is fed from the reel 42 to reel 44, the opposite empty and filled reel conditions are reached wherein approximately three inches of tape will be fed from the reel 42 with each revolution while approximately ten inches will be placed on the reel 44 with each revolution. Due to the increase in diameter of the tape 46 on the reel 44, controlled slippage increases at the magnetic clutch 82 and the output speed decreases. Accordingly, the magnetic clutch 82 initially provides approximately one-half revolution of the driven part 96 for each capstan shaft revolution. At the end of the tape take-up operation, the clutch slip increases so that the driven part 96 rotates only about twenty percent of a revolution relative to a complete rotation of the capstan shaft. At the end of the winding operation, the torque developed in the supply portion of the tape 46 between the reel 42 and capstan 24 will change slightly to about twice the initial tension. As noted above, the reel 42 reaches its highest rotational speed and the reel 44 reaches its slowest rotational speed when the tape coil on the reel 44 includes substantially all of the strip of tape 46 provided in the cartridge 38. In typical operation the tape movement is continuous for a period of one month.

Figure 6:
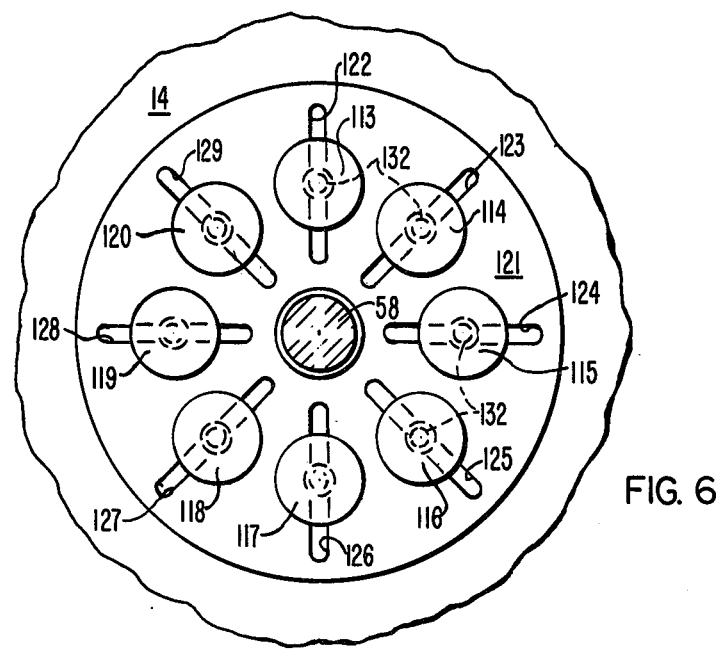
FIG. 6 is a cross-sectional view taken along the axis VI—IV in FIG. 5 and looking in the direction of the arrows.
Figure 5:
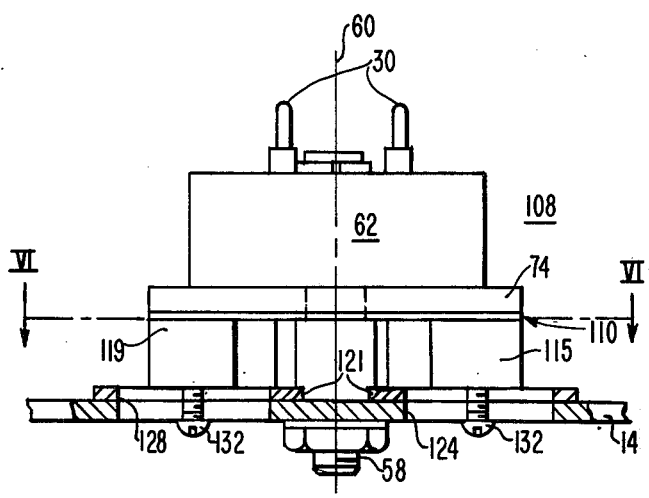
FIG. 5 is a side elevational view with parts broken away of an alternative embodiment of a magnetic brake including a magnetic coupling adjusting arrangement.

An alternative embodiment of a supply spindle assembly 108 is shown in FIGS. 5 and 6 including an alternative magnetic brake 110 having a magnetic coupling adjustment feature. The spindle shaft 58 is substantially as described in connection with the description of the supply spindle assembly 28. A soft magnetic plate 74 and integral pin suppport disc 62 with the pins 30 are also provided as described hereinabove for the assembly 26. A series of eight separate cylindrical permanent magnets 113, 114, 115, 116, 117, 118, 119, and 120 are slidably mounted on a soft or permeable magnetic support plate 121 to define eight separate magnetic poles of the stationary part of the magnetic brake 110. The permanent magnets are mounted in slots 122, 123, 124, 125, 126, 127, 128 and 129 extending through both the magnet support plate 121 and the bottom plate 14. Screws 132 extending through the slots clamp the permanent magnets in adjustable radial positions relative to the center axis 60 of the supply spindle assembly 108 when arranged as is the assembly 26 in the recorder. Accordingly, a variable drag torque can be adjusted by the positioning of the separate permanent magnets 113 through 119 relative to different radial positions of the magnetic plate 74. Fewer than all eight of the separate permanent magnets, such as alternate permanent magnets 113, 115, 117 and 119, may be mounted in slots so that they can be adjusted to provide a desired reel drag adjustment to produce a desired drag during the tape playout operation of the assembly 108. The non-magnetic plastic spacer washer 78 is provided between the faces of the permanent magnets designated 113 through 120 and the bottom surface of the magnetic plate 74 as provided in the assembly 26. Thus, the washer 78 provides the air gap spacing and protection of the magnetic air gap from debris and magnetic particles. As noted for the spacer washer 78 hereinabove, adjusting of the thickness of the washer is a further means of adjusting the magnetic gap between permanent magnets and the plate 74 to adjust the retarding torque or magnetic drag produced by the magnetic brake 110. The washer 78 also produces additional frictional retarding force as the plate 74 is rotated thereon.

While preferred embodiments of the present invention have been described hereinabove, it is to be understood that obvious modifications and alterations thereof may be made by those skilled in the art without departing from the spirit and scope of the following claims.

I claim:

1. A tape recorder device having a tape transport assembly for continuously moving a recording tape between supply and take-up reels, comprising:
   a capstan assembly including a capstan shaft having an upper end for drivingly engaging the recording tape, and a drive motor having a direct drive engagement with a lower end of said capstan shaft;
   a supply spindle assembly including a spindle shaft carrying a supply reel engaging member at the upper end thereof and a magnetic brake arrangement mounted about a lower portion of said shaft, said magnetic brake arrangement including axially spaced stationary and rotatable parts, one of said parts being formed of a permanent magnet material and including a plurality of circumferentially spaced magnetic poles and the other of said parts being a plate of a permeable magnetic material, and said supply spindle assembly further including a non-magnetic spacer washer made of plastic film material supporting said rotating part on said stationary part such that the axial spacing of said parts is determined by the thickness of said washer and retarding forces are produced by both the frictional engagement between said washer and said rotating part and magnetic coupling between said stationary and rotating parts; and
   a take-up spindle assembly including a spindle shaft carrying a take-up reel engaging member at the upper end thereof and a clutch arrangement mounted about a lower portion of said spindle shaft, said clutch arrangement including driving and driven parts with said driven part being connected in continuously driven relationship with the lower end of said capstan shaft.

2. A tape recorder device as claimed in claim 1 wherein said magnetic brake arrangement includes a spacer washer made of a Mylar plastic film material.

3. A tape recorder device as claimed in claim 1 wherein said supply spindle assembly includes said shaft carrying an enlarged diameter section, and wherein said magnetic brake arrangement has the stationary part thereof formed by the permanent magnet material having a flat ring configuration with a magnet support plate made of a permeable magnetic material and integrally attached to the flat ring of permanent magnet material, and further wherein a lower shoulder of the enlarged diameter section engages said magnet support plate to secure said stationary part in said recorder device.

4. A tape recorder device as claimed in claim 3 wherein said supply reel engaging member has integrally attached thereto said plate of permeable magnetic material forming said rotatable part of said magnet brake arrangement.

5. A tape recorder device as claimed in claim 4 wherein said enlarged diameter section of the supply spindle shaft has a length not greater than the height of the permanent magnet flat ring with said spacer washer extending over an upper shoulder of said enlarged diameter section.

6. A tape recorder device as claimed in claim 4 wherein said supply reel engaging member includes at least one pin engageable with said supply reel and a disc member supporting said at least one pin so that the pin extends from the top thereof with said disc member further carrying the permeable magnetic plate on the bottom thereof.

7. A tape recorder device as claimed in claim 1 wherein said clutch arrangement of said take-up spindle assembly includes a magnetic clutch having one of said driving and driven parts being axially spaced and the other of the parts and formed of a permanent magnet material and further having the other of said driving and driven parts formed of a permeable magnetic material so that the driven part is magnetically coupled for variable rotation in response to rotation of said driving part.

8. A tape recorder device as claimed in claim 7 wherein said magnetic clutch includes a non-magnetic plastic spacer washer disposed in the axial space between said driving and driven parts thereof.

* * * * *